United States Patent
Inaguchi (10) Patent No.: US 10,124,457 B2
(45) Date of Patent: Nov. 13, 2018

(54) MACHINE TOOL HAVING INSPECTION FUNCTION FOR DETERIORATED STATE OF SPINDLE

(71) Applicant: FANUC Corporation, Yamanashi (JP)

(72) Inventor: Yuuzou Inaguchi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 74 days.

(21) Appl. No.: 15/096,319

(22) Filed: Apr. 12, 2016

(65) Prior Publication Data

US 2016/0297043 A1 Oct. 13, 2016

(30) Foreign Application Priority Data

Apr. 13, 2015 (JP) ................. 2015-081434

(51) Int. Cl.
*G01C 23/00* (2006.01)
*B23Q 17/00* (2006.01)
(Continued)

(52) U.S. Cl.
CPC ........... *B23Q 17/008* (2013.01); *B23Q 3/157* (2013.01); *G08B 21/187* (2013.01); *G08B 25/08* (2013.01)

(58) Field of Classification Search
CPC .... B23Q 17/008; B23Q 3/147; B23Q 3/0909; B23Q 3/00; B23Q 3/008; B23Q 3/0957;
(Continued)

(56) References Cited

U.S. PATENT DOCUMENTS 4,786,220 A * 11/1988 Fildes ...................... G01N 3/56
  408/11
5,921,726 A *  7/1999 Shiozaki .................. B23Q 1/70
  408/6
(Continued)

FOREIGN PATENT DOCUMENTS

CN  1906473 A  1/2007
CN  104166371 A  11/2014
(Continued)

OTHER PUBLICATIONS

Office Action in JP Application No. 2015-081434, dated May 2, 2017.
(Continued)

*Primary Examiner* — Harshad R Patel
*Assistant Examiner* — Nigel Plumb
(74) *Attorney, Agent, or Firm* — Hauptman Ham, LLP (57) ABSTRACT

In order to make it possible to inspect a deteriorated state of a spindle incorporated in a machine tool without disassembling the machine tool, a command for speed V0 is output to the spindle and, when the rotating speed of the spindle reaches V0, power of a spindle motor is interrupted and a timer is started. The spindle continues to rotate with inertia while decelerating. Time T clocked by the timer when the spindle speed decreases to zero is read. When time T is outside a range between the upper and lower limits, the spindle is in the deteriorated state, and an alarm is output. When time T is not greater than the lower limit, the spindle and a bearing of the spindle are deteriorated and friction resistance increases. When time T is larger than the upper limit, oil holding force of grease of the bearing is deteriorated.

13 Claims, 8 Drawing Sheets

(51) Int. Cl.
*B23Q 3/157* (2006.01)
*G08B 21/18* (2006.01)
*G08B 25/08* (2006.01)

(58) Field of Classification Search
CPC .......... B23Q 3/22; B23Q 3/20; B23Q 3/2452; A63B 2220/40; G01P 21/02; G01H 1/00; G08B 25/08
See application file for complete search history.

(56) References Cited

U.S. PATENT DOCUMENTS

| | | | | |
|---|---|---|---|---|
| 6,140,931 | A * | 10/2000 | Yamane | B23Q 1/38 318/571 |
| 2001/0049974 | A1 * | 12/2001 | Akamatsu | B23Q 17/22 73/865.9 |
| 2002/0118372 | A1 * | 8/2002 | Bucher | G01B 11/14 356/613 |
| 2003/0163286 | A1 * | 8/2003 | Yasugi | G05B 19/4065 702/185 |
| 2008/0234964 | A1 * | 9/2008 | Miyasaka | G01H 1/003 702/113 |
| 2009/0043418 | A1 * | 2/2009 | Diemer | B23Q 3/155 700/175 |
| 2009/0299663 | A1 * | 12/2009 | Butz | G01M 13/045 702/56 |
| 2014/0338468 | A1 | 11/2014 | Ogawa | |

FOREIGN PATENT DOCUMENTS

| | | |
|---|---|---|
| JP | 2000-107977 A | 4/2000 |
| JP | 2003-271212 A | 9/2003 |
| JP | 2008-175821 A | 7/2008 |
| JP | 2009-080092 A | 4/2009 |
| WO | 2006/030786 A1 | 3/2006 |

OTHER PUBLICATIONS

Office Action in CN Application No. 201610228548.0, dated Mar. 5, 2018, 12pp.

* cited by examiner

MACHINE TOOL HAVING INSPECTION FUNCTION FOR DETERIORATED STATE OF SPINDLE

RELATED APPLICATIONS

The present application claims priority to Japanese Patent Application Number 2015-081434, filed Apr. 13, 2015, the disclosure of which is hereby incorporated by reference herein in its entirety.

BACKGROUND OF THE INVENTION

1. Field of the Invention

The present invention relates to a machine tool having a function of inspecting a deteriorated state of a spindle of the machine tool.

2. Description of the Related Art

A spindle of a machine tool has a durable life. When the spindle is used for a long period of time, the spindle is deteriorated, and deterioration in machining accuracy and a rotation failure due to seizure or the like of a bearing sometimes occur. When such failures occur, repair is necessary. However, the seizure or the like of the bearing sometimes occurs without a sign. In such a case, the spindle needs to be urgently repaired in order to maintain production of a factory. However, when a replacement component cannot be immediately acquired, the production ability of the factor substantially decreases. Therefore, if a deteriorated state of the spindle is inspected and a sign of a failure can be detected, it is possible to avoid a sudden production decrease of the factory by replacing the spindle beforehand.

As a method and an apparatus for performing performance evaluation of a bearing, Japanese Patent Application Laid-Open No. 2009-80092 describes a bearing-friction measuring method and a bearing-friction measuring apparatus for supporting a rotating body on a measurement target bearing, rotating the rotating body, in a state in which the rotating body is rotating, interrupting transmission of rotation torque, causing the rotating body to self-rotate with inertia, calculating friction torque of the bearing on the basis of rotation angular velocity and an inertial moment of the rotating body at the time of the self-rotation, measuring friction of the bearing, and evaluating the performance of the bearing.

When it is attempted to measure a deteriorated state of the spindle, the bearing-friction measuring method and the bearing-friction measuring apparatus described in Japanese Patent Application Laid-Open No. 2009-80092 cannot be applied. A dedicated bearing-friction measuring apparatus is necessary for the bearing-friction measuring method described in Japanese Patent Application Laid-Open No. 2009-80092. The bearing-friction measuring method is not a method of inspecting a bearing attached to a machine tool. Therefore, it may be impossible to detect a deteriorated state of a spindle (a deteriorated state of a spindle bearing) in a usable state of a machine tool without disassembling a spindle head.

SUMMARY OF THE INVENTION

Therefore, an object of the present invention is to provide a machine tool having a function capable of inspecting a deteriorated state of a spindle incorporated in the machine tool.

A machine tool according to the present invention includes a spindle configured to hold a tool that machines work and rotatably supported by a bearing, a motor configured to drive the spindle, and an encoder configured to measure a rotation angle position of the spindle or the motor. The machine tool detects a deteriorated state of the spindle.

The machine tool according to the present invention includes: speed calculating unit for calculating rotating speed of the spindle or the motor from an output of the encoder; unit for rotating the spindle or the motor at predetermined speed and thereafter interrupting power of the motor to rotate the spindle with inertia; clocking unit for measuring, after the power of the motor is interrupted, an inertial rotation time until the rotating speed calculated by the speed calculating unit reaches set target speed; determining unit for setting the time measured by the clocking unit as a value to be compared with a threshold and determining whether the value is equal to or smaller than the threshold set in advance; and alarm output unit for outputting an alarm when the determining unit determines that the value is larger than the threshold. The machine tool itself has an inspection function for the deteriorated state of the spindle.

The machine tool according to the present invention may further include acceleration calculating unit for calculating acceleration by dividing, by the time clocked by the clocking unit, a difference between the predetermined speed and the set target speed at the time of the interruption of the power of the motor. The determining unit may set, instead of the time, the acceleration calculated by the acceleration calculating unit as a value to be compared with the threshold, and determine whether the acceleration is equal to or smaller than the threshold set in advance.

The machine tool according to the present invention may further include unit for calculating rotation resistance torque from the calculated acceleration and an inertial moment of a rotating body including the spindle. The determining unit may set, instead of the acceleration, the calculated rotation resistance torque as a value to be compared with a threshold and determine whether the rotation resistance torque is equal to or smaller than the threshold set in advance.

A machine tool according to the present invention includes a spindle configured to hold a tool that machines work and rotatably supported by a bearing, a motor configured to drive the spindle, and an encoder configured to measure a rotation angle position of the spindle or the motor. The machine includes: speed calculating unit for calculating rotating speed of the spindle or the motor from an output of the encoder; unit for rotating the spindle or the motor at predetermined speed and thereafter interrupting power of the motor to rotate the spindle with inertia; clocking unit for clocking a set predetermined time after the power of the motor is interrupted; unit for detecting rotating speed calculated by the speed calculating unit when the set predetermined time is clocked by the clocking unit; unit for calculating a value to be compared with a threshold, on the basis of the predetermined speed at a time when the power of the motor is interrupted, the rotating speed detected when the clocking unit clocks the predetermined time, and the set predetermined time; determining unit for determining whether the calculated value to be compared with the threshold is equal to or smaller than a threshold set in advance; and alarm output unit for outputting an alarm when the determining unit determines that the value is larger than the threshold. The machine tool itself has an inspection function for a deteriorated state of the spindle.

A machine tool according to the present invention includes a spindle configured to hold a tool that machines work and rotatably supported by a bearing, a motor configured to drive the spindle, and an encoder configured to measure a rotation angle position of the spindle or the motor. The machine includes: speed calculating unit for calculating rotating speed of the spindle or the motor from an output of the encoder; unit for rotating the spindle or the motor at predetermined speed and thereafter interrupting power of the motor to rotate the spindle with inertia; comparative-value calculating unit for calculating a value to be compared with a threshold, from a measured value of the encoder during inertial rotation of the spindle; determining unit for determining whether the value calculated by the comparative-value calculating unit is equal to or smaller than a threshold set in advance; and alarm output unit for outputting an alarm when the determining unit determines that the value is larger than the threshold. The machine tool has an inspection function for a deteriorated state of the spindle.

In the machine tool according to the present invention, the value to be compared with the threshold may be acceleration or rotation resistance torque during spindle deceleration.

In the machine tool according to the present invention, a value to be compared with a threshold for a plurality of temperatures near the spindle may be calculated and stored in advance as reference data or a function calculated from the data may be stored, a correction amount may be calculated on the basis of the reference data or the function, and the value to be compared with the threshold may be corrected or the threshold may be corrected.

The machine tool according to the present invention may further include unit for storing an execution enabling condition for the inspection function for the deteriorated state of the spindle in storing unit in advance and, when an inspection command for the deteriorated state of the spindle is given, determining whether the stored execution enabling condition is satisfied, and determining possibility of execution of the inspection of the deteriorated state of the spindle. The machine tool according to the present invention may further include storing unit for storing an operation history of the spindle. The execution enabling condition may be whether the operation history stored in the storing unit satisfies an operation history determined in advance. The machine tool according to the present invention may further include storing unit for storing date and time when an inspection function for the deteriorated state of the spindle is executed. The execution enabling condition may be whether an elapsed time from the last inspection date and time stored in the storing unit exceeds a threshold set in advance. The machine tool according to the present invention may further include a temperature sensor configured to measure at least one of temperature of the spindle motor, bearing temperature of the spindle, and temperature near the bearing of the spindle. The execution enabling condition may be whether the temperature detected by the temperature sensor is within a set threshold range. The machine tool according to the present invention may be a machine tool including a tool replacing device. The machine tool may execute the inspection function for the deteriorated state of the spindle during tool replacement in a period after the tool is detached from the spindle and before a next tool is attached.

A machine tool according to the present invention includes a spindle configured to hold a tool that machines work and rotatably supported by a bearing, a motor configured to drive the spindle, and an encoder configured to measure a rotation angle position of the spindle or the motor. The machine includes: speed calculating unit for calculating rotating speed of the spindle or the motor from an output of the encoder; unit for rotating the spindle or the motor at predetermined speed and thereafter interrupting power of the motor to rotate the spindle with inertia; acceleration calculating unit for calculating acceleration of deceleration on the basis of an output of the encoder read at every predetermined cycle during the inertial rotation of the spindle; position/acceleration storing unit for storing, at the every predetermined cycle, the rotation angle position read from the encoder and the acceleration calculated by the acceleration calculating unit; and unit for determining whether acceleration equal to or larger than a predetermined threshold occurs in every same rotation angle amount. The machine tool outputs an alarm of vibration generation with, for example, an indentation of the bearing when it is determined that acceleration equal to or larger than the predetermined threshold occurs in the every same rotation angle amount.

BRIEF DESCRIPTION OF THE DRAWINGS

The objects and the features explained above and other objects and features of the present invention will be made clear from the following explanation of embodiments with reference to the accompanying drawings. Among the figures.

DETAILED DESCRIPTION OF THE PREFERRED EMBODIMENTS

The present invention relates to a machine tool having a function of inspecting a deteriorated state of a spindle of the machine tool. The present invention is applied to the machine tool including a spindle configured to hold a tool. The hardware configuration of the machine tool is the same as the hardware configuration of a conventional machine tool. In the present invention, software for carrying out an inspection function for a spindle deteriorated state is stored in a control device such as a numerical control device that controls the machine tool. Inspection processing for the spindle deteriorated state is performed by the software, whereby the spindle deteriorated state is detected.

Figure 1:
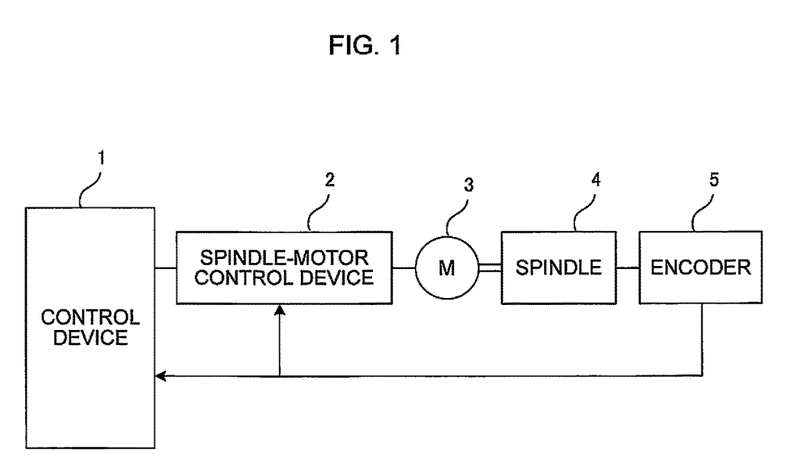
FIG. 1 is a main part block diagram of an embodiment for carrying out the present invention.

FIG. 1 is a main part block diagram in an embodiment of the present invention. Only a main part of a portion related to the present invention is shown. Reference numeral 1 denotes a control device such as a numerical control device that controls a machine tool, 2 denotes a spindle-motor control device, 3 denotes a spindle motor, 4 denotes a spindle driven by the spindle motor 3, and 5 denotes an encoder that detects a rotation angle position of the spindle motor 3 or the spindle 4 attached to the spindle motor 3. The rotation angle position detected by the encoder 5 is fed back to the spindle-motor control device 2 or the control device 1.

When a speed command is output from the control device 1 to the spindle-motor control device 2, the spindle-motor control device 2 feedback-controls the spindle 4 or the spindle motor 3 to rotate at commanded speed, on the basis of the speed command and the rotation angle position fed back from the encoder 5. The feedback control of the spindle 4 or the spindle motor 3 is the same as the conventional feedback control. In the configuration of the present invention, a deteriorated state of the spindle 4 is detected using the feedback control of the spindle 4 or the spindle motor 3 by the spindle-motor control device 2 and a rotation angle position signal of the spindle 4 or the spindle motor 3 output from the encoder 5.

Figure 2:
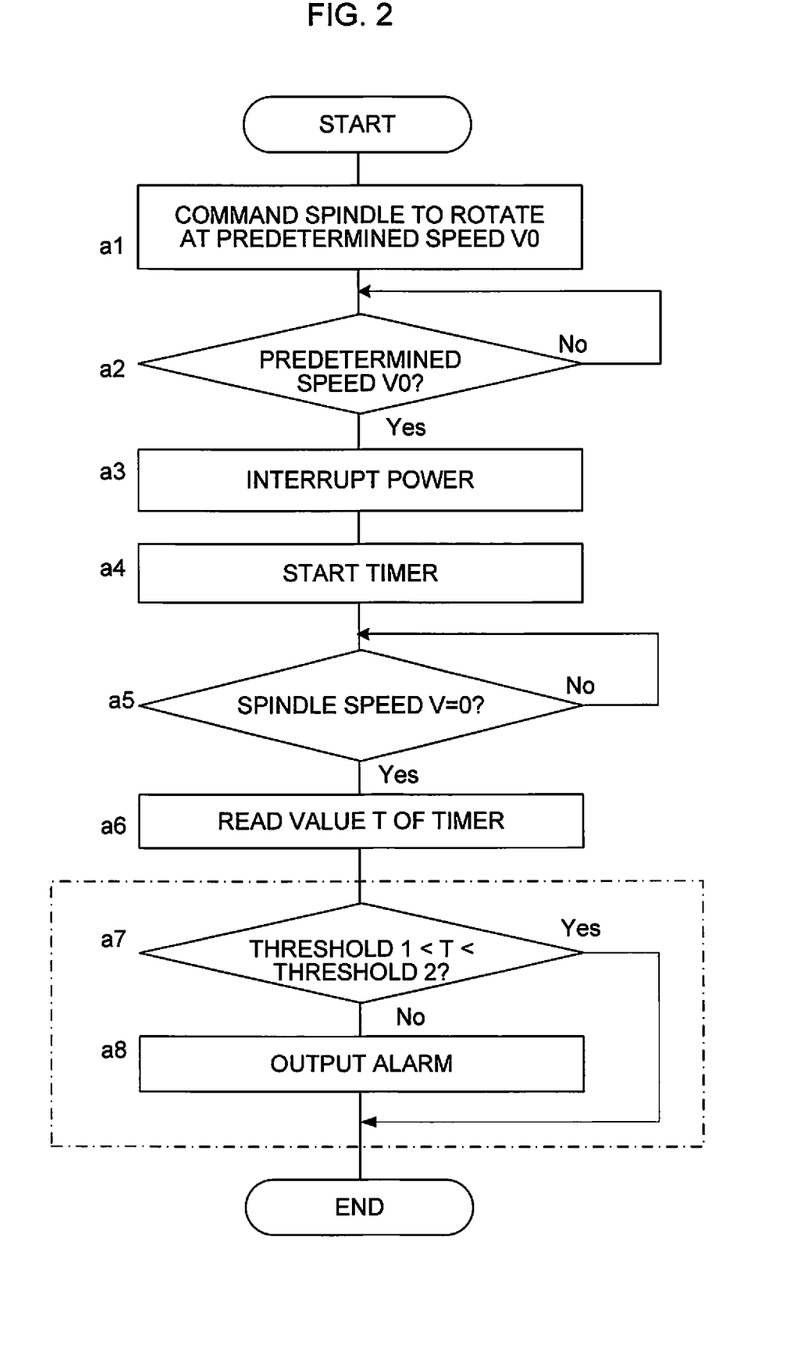
FIG. 2 is a flowchart for explaining an algorithm in a first aspect of spindle-deterioration inspection processing in the embodiment shown in FIG. 1.

FIG. 2 is a flowchart for explaining an algorithm of software in a first aspect of spindle-deterioration-state inspection processing stored in a memory in the control device 1. When a spindle-deteriorated-state detection command is manually input or input from a computer program, a processor of the control device 1 starts the processing shown in FIG. 2.

First, the processor outputs a speed command for predetermined speed V0 (e.g., 100 revolutions/minute) determined in advance to the spindle-motor control device 2 (step a1). The processor reads, at every predetermined cycle, a rotation angle position signal fed back from the encoder 5, calculates rotating speed, and determines whether the rotating speed is the commanded speed V0 (step a2). The processor waits until the rotating speed of the spindle 4 or the spindle motor 3 reaches the commanded speed V0. When the rotating speed of the spindle 4 or the spindle motor 3 reaches the commanded speed V0, the processor interrupts power to the spindle motor 3 and, at the same revolution starts a timer (steps a3 and a4). Even if the power of the spindle motor 3 is interrupted, the spindle 4 continues to rotate with inertia (coasts) for a while. When detecting a rotation stop of the spindle 4 on the basis of a feedback signal from the encoder 5 (step a5), the processor reads a value T of the timer at that point (step s6). The read value T of the timer unit a coasting time (an inertial rotation time). The processor determines whether the coasting time T is within a range between a threshold 1 and a threshold 2 (the threshold 1< the threshold 2) set in advance (step a7). If the coasting time T is within the range between the threshold 1 and the threshold 2, the processor determines that the spindle 4 is not deteriorated and ends the inspection processing for the spindle deteriorated state.

On the other hand, if the coasting time T is outside the range between the first threshold 1 and the threshold 2, the processor determines that the spindle 4 is deteriorated, outputs an alarm signal, performs alarm display or the like on a display or the like of the control device 1 (step a8), and ends the processing. When the coasting time (the inertial rotation time) is short and the time T measured by the timer is equal to or smaller than the threshold 1, it can be inferred that the spindle 4 and a bearing of the spindle 4 are deteriorated and frictional resistance increases. When the time T measured by the timer is larger than the threshold 2, it can be inferred that oil holding force of grease of the bearing is deteriorated.

In the inspection processing for the spindle deteriorated state, time in which the rotating speed of the spindle 4 or the spindle motor 3 decreases from the commanded speed V0 to zero, that is, the coasting time T is calculated. The spindle deteriorated state is detected according to the coasting time T. However, the processor may calculate, without waiting for the rotating speed of the spindle 4 or the spindle motor 3 to decrease to zero, time until the rotating speed reaches predetermined target speed and detect the spindle deteriorated state according to this time. For example, the processor may set the commanded speed V0 to the spindle 4 or the spindle motor 3 in step a1 to "100 revolutions/minute", determine whether the rotating speed of the spindle 4 or the spindle motor 3 reaches "60 revolutions/minute" in step a5, calculate the coasting time (the inertial rotation time) T taken for the rotating speed of the spindle 4 or the spindle motor 3 to change from 100 revolutions/minute to 60 revolutions/minute, and inspect the spindle deteriorated state according to the time T.

Further, the processor may calculate, dividedly in several stages, values (coasting times) of the timer (e.g., T1, T2, and T3) at the times when the rotating speed of the spindle 4 or the spindle motor 3 reaches 60 revolutions/minute, 30 revolutions/minute, and 0 revolutions/minute, and make it possible to estimate a deteriorated state of the spindle 4 in detail according to the calculated plurality of times T1, T2, and T3.

In the inspection processing for the spindle deteriorated state in the first aspect, the processor detects the spindle deteriorated state according to the coasting time T. When the spindle 4 is coasting and rotating, the spindle rotating speed is decelerated, and the processor may detect the spindle deteriorated state according to acceleration of the deceleration instead of the coasting time T.

Figure 3:
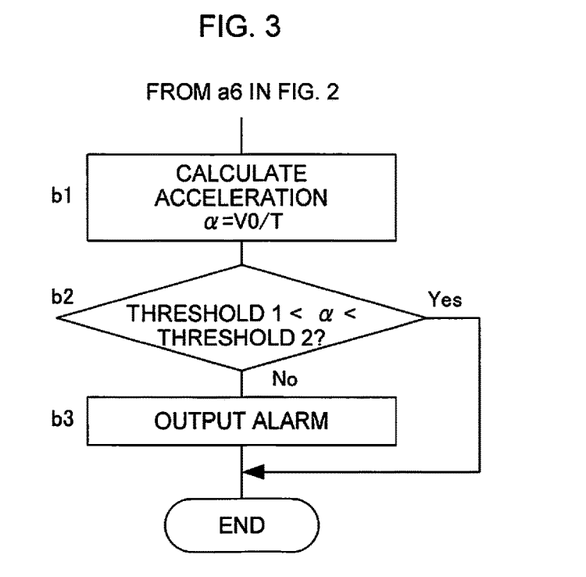
FIG. 3 is a flowchart for explaining a main part algorithm in a second aspect of the spindle-deterioration inspection processing in the embodiment shown in FIG. 1.

FIG. 3 shows a part of a flowchart for explaining an algorithm of software of processing in a second aspect for inspecting a spindle deteriorated state according to deceleration acceleration. Steps a7 and a8 in the first aspect shown in FIG. 2 are replaced with steps b1 to b3 shown in FIG. 3. Only the replacing steps are shown in the figure. That is, a portion surrounded by a broken line in FIG. 2 is replaced with the flowchart of FIG. 3. In this second aspect, after executing the processing up to step a6 in FIG. 2, the processor subtracts speed 0 at a coasting end time from the speed V0 at a coasting start time to calculate a speed change amount (V0−0=V0) and divides the speed change amount by the coasting time T calculated from the value of the timer to calculate deceleration acceleration α (step b1). The processor determines whether the calculated acceleration α is within a set range between a lower limit threshold 1 and an upper limit threshold 2 (step b2). If the acceleration α is within the range, the processor determines that the spindle 4 is not deteriorated and ends the processing. If the acceleration α is outside the range, the processor outputs an alarm (step b3) and ends the processing.

In the second aspect, as in the first aspect, the processor may calculate time until the rotating speed of the spindle 4 or the spindle motor 3 reaches determined speed rather than calculating time until the rotating speed decreases to "0" and calculate acceleration. For example, if speed (commanded speed) at the coasting start is V0 (the commanded speed in step a1) and time from the interruption of the power to the spindle motor 3 and the start of the coasting until the rotating speed of the spindle 4 or the spindle motor 3 reaches V1 (the speed detected in step a5) is T1 (the speed read out in step a6), the acceleration α is calculated as α=(V0−V1)/T1. The spindle deteriorated state is inspected according to the calculated acceleration.

The processor may calculate the acceleration dividedly in a plurality of speed regions. It is possible to set the coasting start speed (the commanded speed) to V0, calculate the times T1, T2, and T3 until the rotating speed of the spindle 4 or the spindle motor 3 reaches V1, V2, and V3, calculate accelerations α1=(V0−V1)/T1, α2=(V0−V2)/T2, and α3=(V0−V3)/T3 in the respective regions, and estimate the spindle deteriorated state in detail on the basis of the accelerations in the regions.

Figure 4:
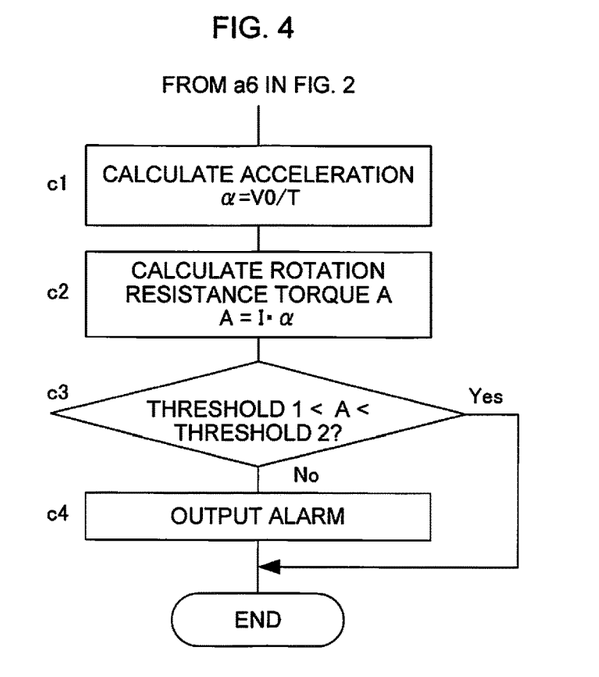
FIG. 4 is a flowchart for explaining a main part algorithm in a third aspect of the spindle-deterioration inspection processing in the embodiment shown in FIG. 1.

FIG. 4 shows a part of a flowchart for explaining an algorithm of software of processing in a third aspect for inspecting a spindle deteriorated state according to rotation resistance torque. Steps a7 and a8 in the first aspect shown in FIG. 2 are replaced with steps c1 to c4 shown in FIG. 4. Only the replacing steps are shown in the figure. That is, the portion surrounded by the broken line in FIG. 2 is replaced with the flowchart of FIG. 4. In this third aspect, after executing the processing up to step a6 in FIG. 2, the processor subtracts speed 0 at a coasting end time from the speed V0 of the spindle 4 or the spindle motor 3 at a coasting start time to calculate a speed change amount (V0−0=V0) and divides the speed change amount by the coasting time T calculated from the value of the timer to calculate deceleration acceleration α (step c1). The processor multiplies the calculated acceleration α by a previously set inertial moment I of a rotating body including the spindle 4 and rotating together with the spindle 4 to calculate rotation resistance torque A (step c2). The processor determines whether the calculated rotation resistance torque A is within the range between the lower limit threshold 1 and the upper limit threshold 2 set in advance (step c3). If the rotation resistance torque A is within the range, the processor determines that the spindle 4 is not deteriorated and ends the processing. If the rotation resistance torque A is outside the range, the processor outputs an alarm (step c3) and ends the processing.

In the third aspect, the processing up to the calculation of the acceleration α is the same as in the second aspect shown in FIG. 3. Therefore, as in the second aspect, a method of calculating the acceleration α according to a coasting time until speed during coasting of the spindle 4 reaches predetermined speed or a method of calculating accelerations dividedly in a plurality of speed regions may be adopted as the method of calculating the acceleration α. The processor may multiply the calculated accelerations by an inertial moment to calculate respective rotation resistance torques and inspect the spindle deteriorated state on the basis of the rotation resistance torques.

Note that, in the second and third aspects, after causing the spindle 4 to perform the inertial rotation (the coasting rotation), the processor may calculate the time until the rotating speed of the spindle reaches the determined speed. However, conversely, the processor may calculate, after causing the spindle 4 to perform the inertial rotation (the coasting rotation), speed after the elapse of a predetermined time (note that the predetermined time is set to a predetermined time in which speed does not decrease to zero), divide a difference between the calculated speed and speed at the time of a coasting rotation start by the predetermined time to calculate acceleration and rotation resistance torque.

Figure 5:
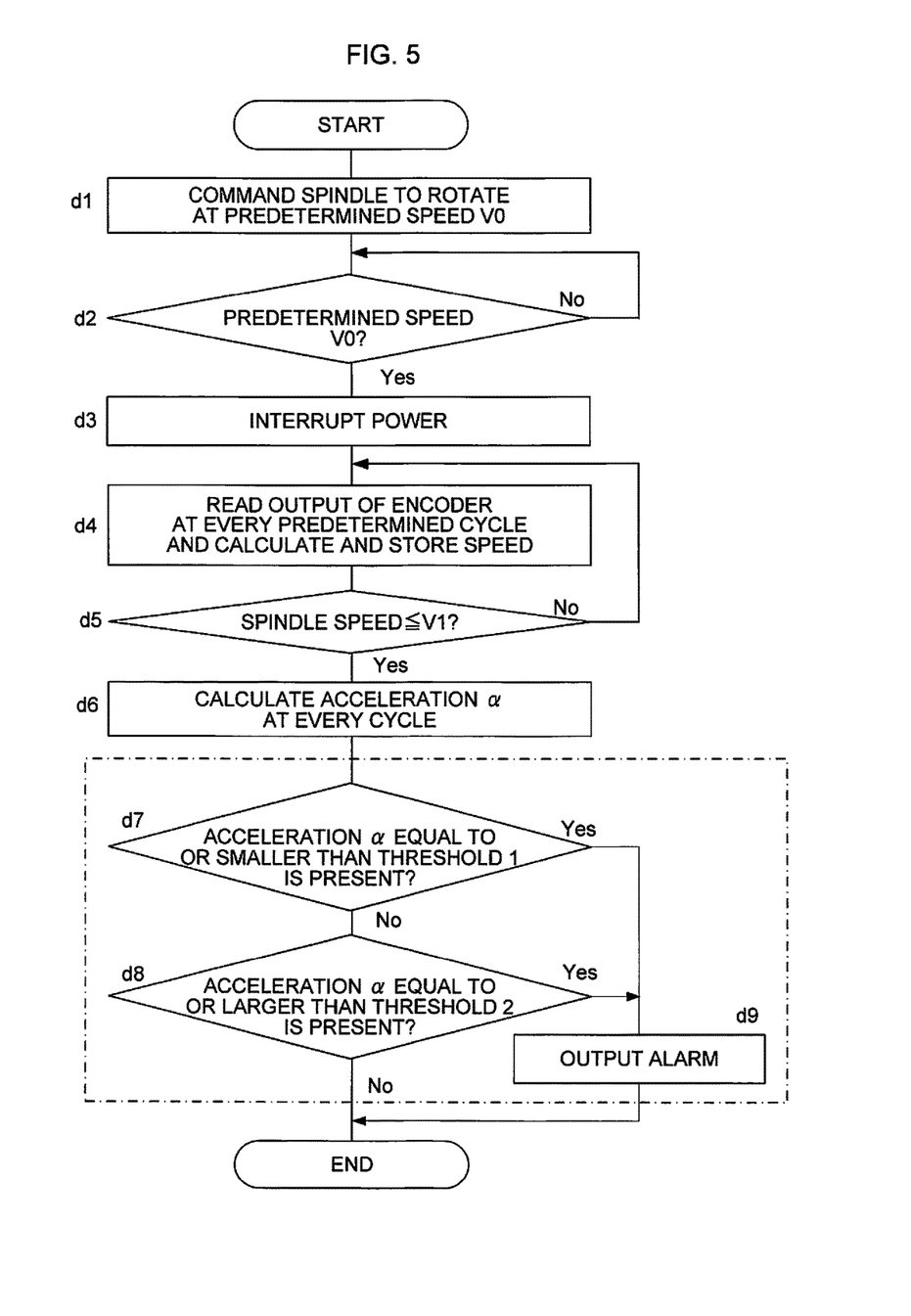
FIG. 5 is a flowchart for explaining an algorithm in a fourth aspect of the spindle-deterioration inspection processing in the embodiment shown in FIG. 1.

FIG. 5 is a flowchart for explaining an algorithm of software of processing in a fourth aspect for calculating deceleration acceleration of the spindle at every predetermined cycle and inspecting a spindle deteriorated state.

When a spindle-deteriorated-state detection command is manually input or input from a computer program, the processor of the control device 1 starts the processing shown in FIG. 5 and outputs a speed command for the predetermined speed V0 determined in advance to the spindle-motor control device 2 (step d1). The processor determines whether the rotating speed of the spindle 4 or the spindle motor 3 reaches the commanded speed V0 from a rotation angle position signal fed back from the encoder 5 (step d2). The processor waits until the rotating speed of the spindle 4 or the spindle motor 3 reaches the commanded speed V0. When the rotating speed of the spindle 4 or the spindle motor 3 reaches the commanded speed V0, the processor interrupts the power to the spindle motor 3 (step d3). Subsequently, the processor reads, at every predetermined period, a rotation angle position of the spindle 4 or the spindle motor 3 output from the encoder 5, calculates rotating speed, and stores the rotating speed in the memory (step d4). The processor determines whether the rotating speed of the spindle 4 or the spindle motor 3 decreases to a set voltage V1 or less (step d5). If the rotating speed does not decrease to the set speed V1 (including V1=0), the processor returns to step d4. Thereafter, the processor repeatedly executes the processing in steps d4 and d5 at every predetermined cycle until the rotating speed of the spindle 4 or the spindle motor 3 decreases to the set speed V1 or less.

When the rotating speed of the spindle 4 or the spindle motor 3 decreases to the set speed V1 or less, the processor proceeds to step d6 and calculates acceleration according to rotating speeds at respective cycles calculated at every cycle stored in the memory (calculates the acceleration by dividing a difference between rotating speeds at the present cycle and the preceding cycle by a cycle time). Subsequently, the processor inspects whether acceleration equal to or smaller than the lower limit threshold 1 set in advance is present (step d7). When all accelerations are larger than the lower limit threshold 1, the processor determines whether acceleration equal to or larger than the upper limit threshold 2 is present (step d8). If all the calculated accelerations are within the range between the lower limit threshold 1 and the upper limit threshold 2, the processor ends the spindle-deteriorated-state inspection processing.

On the other hand, when acceleration equal to or smaller than the lower limit threshold 1 or acceleration equal to or larger than the upper limit threshold 2 is present among the calculated accelerations, the processor outputs an alarm (step d9) and ends the processing.

Note that, also in the fourth aspect, the processor may multiply the acceleration α calculated in step d7 by the inertial moment I of the rotating body including the spindle 4 and rotating together with the spindle 4 to calculate rotation resistance torque and determine whether the rotation resistance torque is within the range of the set range between the lower limit threshold 1 and the upper limit threshold 2.

Figure 6:
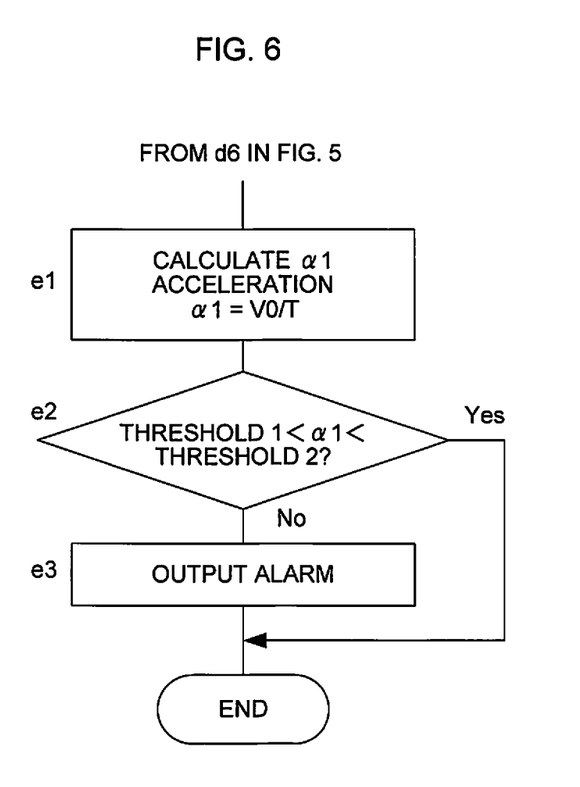
FIG. 6 is a flowchart for explaining a main part algorithm in a fifth aspect of the spindle-deterioration inspection processing in the embodiment shown in FIG. 1.

FIG. 6 is a flowchart for explaining an algorithm of software of processing in a fifth aspect for calculating deceleration acceleration of the spindle or the spindle motor at every predetermined cycle and inspecting a spindle deteriorated state, as in the fourth aspect shown in FIG. 5.

In the fifth aspect, a deteriorated state of the spindle is inspected according to a calculated average of accelerations at respective cycles. In the fifth aspect, steps d7 to d9 in the fourth aspect shown in FIG. 5 are replaced with steps e1 to e3 shown in FIG. 6. Only the replacing steps are shown in the figure. That is, a portion surrounded by a broken line in FIG. 5 is replaced with the flowchart of FIG. 6.

After calculating acceleration at every cycle (step d6 in FIG. 5), the processor of the control device 1 calculates an average α1 of accelerations (step e1). The processor determines whether the calculated average α1 of the accelerations is within the set range between the lower limit threshold 1 and the upper limit threshold 2 (step e2). If the average α1 is within the range, the processor determines that the spindle 4 is not deteriorated and ends the processing. If the average α1 is outside the range, the processor outputs an alarm (step e3) and ends the processing.

In a bearing, in general, when temperature changes, the resistance of grease changes and rotation resistance changes. Therefore, when a state of the bearing is inspected using acceleration of inertial rotation, it is desirable to perform the inspection at normal temperature. However, in a machine tool which is being used in a factory, bearing temperature rises according to the operation of the machine tool. However, if the machine tool is stopped until the machine tool is sufficiently cooled, production efficiency of the factory is deteriorated.

Therefore, bearing resistance in an initial state after operation is stored as information peculiar to the machine tool until the machine tool thermally stabilizes, and a value of the bearing resistance and the present value are compared, whereby it is possible to perform inspection even if the machine tool is stopped for a long time.

Alternatively, a temperature sensor that detects the temperature of the peripheral components of the spindle such as the bearing, the spindle motor, and a housing is provided, and when it is detected by the temperature sensor that the set temperature is reached, the spindle-deteriorated-state inspection processing in the above-described aspects is started to inspect spindle deterioration without being affected by the temperature.

Figure 7:
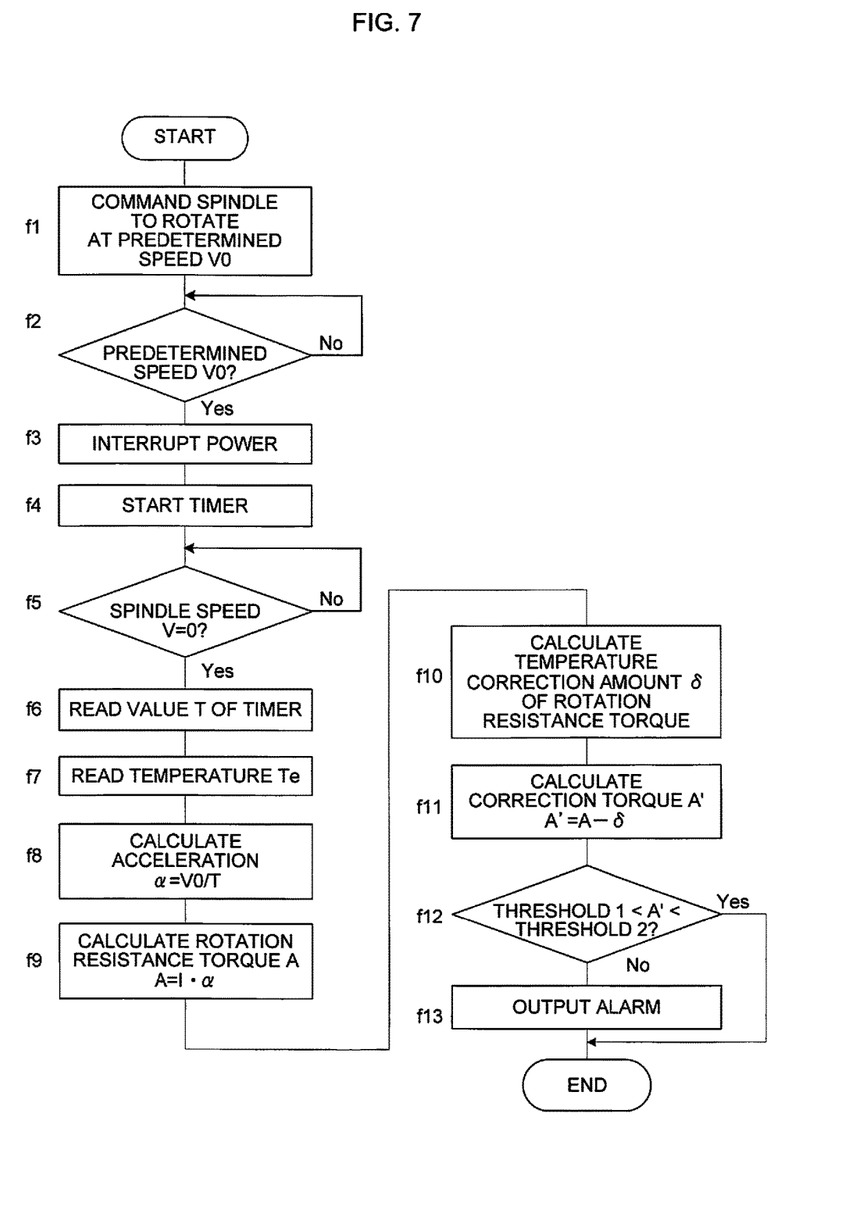
FIG. 7 is a flowchart for explaining an algorithm in a sixth aspect of the spindle-deterioration inspection processing in the embodiment shown in FIG. 1.

Further, the processor may further perform temperature correction and perform the spindle-deteriorated-state inspection processing taking into account the influence of the temperature. FIG. 7 is a flowchart for explaining an algorithm of software in the sixth aspect of the spindle-deteriorated-state inspection processing for performing the temperature correction.

Figure 8:
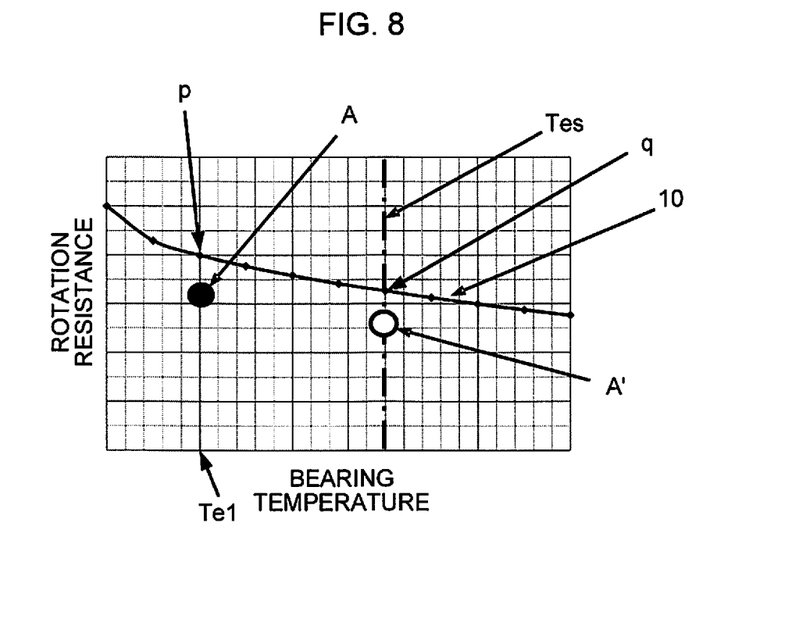
FIG. 8 is a diagram showing a relation between bearing temperature of a spindle and rotation resistance torque of the spindle.

First, a relation between the bearing temperature of the spindle 4 and the rotation resistance torque of the spindle 4 is measured in advance and registered in the memory of the control device 1. FIG. 8 is a diagram showing a measurement result of the relation between bearing temperature and the rotation resistance torque. In FIG. 8, a curve indicated by reference numeral 10 is a measurement result in a bearing initial state indicating a relation of the rotation resistance torque with respect to the bearing temperature and is a rotation resistance temperature curve serving as a reference. Reference sign Tes indicates an evaluation reference temperature for evaluating a bearing deteriorated state. Therefore, when the rotation resistance torque of the spindle is measured, if a measurement value A of the rotation resistance torque is a point shown in FIG. 8 and temperature during the measurement is Te1, a difference between rotation resistance torques at the temperature Te1 during the measurement and the evaluation reference temperature Tes on the rotation resistance temperature curve in the bearing initial state is calculated. Assuming that the rotation resistance torque of the measurement value A changes by the difference at the evaluation reference temperature Tes, an estimated value for bearing deteriorated state evaluation A' is calculated (when rotation resistance torque values on a rotation resistance temperature curve in the bearing initial state at the temperature Te1 during the measurement and the evaluation reference temperature Tes are respectively represented as p and q, a difference p−q between the rotation resistance torque values is calculated as a correction amount and the estimated value for bearing deteriorated state evaluation A' is calculated as A'=A−δ=A−(p−q)). The spindle deteriorated state is determined according to whether the estimated value for bearing deteriorated state evaluation A' is within a range between a lower limit threshold and an upper limit threshold set in advance.

Rotation resistance temperature curve data with respect to the bearing temperature in the bearing initial state shown in FIG. 8 is stored and registered in the memory of the control device 1. Alternatively, an approximation function approximating the rotation resistance temperature curve with respect to the bearing temperature is set in advance. Thereafter, at any point in time, when a spindle-deteriorated-state detection command is manually input or input from the computer program, the processor of the control device 1 starts processing shown in FIG. 7.

Processing for rotating the spindle 4 or the spindle motor 3 at the predetermined speed V0 determined in advance, interrupting the power to the spindle motor 3 after the rotating speed of the spindle 4 or the spindle motor 3 reaches the commanded speed V0, and measuring the time T until the rotation of the spindle 4 stops after interrupting the power is the same as the processing in the first aspect. That is, processing in steps f1 to f6 in FIG. 7 is the same as the processing in steps a1 to a6 in FIG. 2. After reading a value of the timer and calculating the coasting time T (step f6), the processor reads temperature Te detected by the temperature sensor attached to the bearing, the spindle motor, the housing or the like (step f7). The processor subtracts the speed 0 at the coasting end time from the speed V0 of the spindle 4 or the spindle motor 3 at the coasting start time, and divides a change amount of the speed (V0−0=V0) by the coasting time T to calculate the deceleration acceleration α (step f8). The processor multiplies the calculated acceleration α by the previously set inertial moment I of the rotating body including the spindle 4 and rotating together with the spindle 4 to calculate the rotation resistance torque A (step f9).

The processor calculates, using the rotation resistance temperature curve data with respect to the bearing temperature in the bearing initial state registered in advance or the approximation function of the rotation resistance temperature curve data, the correction amount δ from the rotation resistance torque (the p point in FIG. 8) in the bearing initial state at the detection temperature Te and the rotation resistance torque (the q point in FIG. 8) in the bearing initial state at the evaluation reference temperature (step f10). The processor corrects the rotation resistance torque A calculated in step f9 by the correction amount δ and calculates corrected rotation resistance torque A'(=A−δ) (step f11). The processor determines whether the corrected rotation resistance torque A' is within the set range between the lower limit threshold 1 and the upper limit threshold 2 (step f12). If the corrected rotation resistance torque A' is within the range, the processor determines that the spindle 4 is not deteriorated and ends the processing. If the corrected rotation resistance torque A' is outside the range, the processor outputs an alarm (step f13) and ends the processing.

Note that, in the sixth aspect, the processor performs temperature correction on the calculated rotation resistance torque A to calculate the corrected rotation resistance torque A'(=A−δ) and compares the corrected rotation resistance torque A' with a threshold. However, the processor may perform temperature correction on the threshold. That is, as indicated by the following formula, the result of the correction is substantially the same irrespective of which of the rotation resistance torque A and the threshold is corrected.

Threshold $1 < A' = A - \delta <$ threshold $\rightarrow$ threshold $1 + \delta < A <$ threshold$+\delta$ In the sixth aspect, the processor calculates the rotation resistance torque by performing the temperature correction and inspects the spindle deteriorated state. However, as in the sixth aspect, the processor may perform the temperature correction on the coasting time T and the deceleration acceleration α used to inspect the spindle deteriorated state explained in the first, second, fourth, and fifth aspects to inspect the spindle deteriorated state. In this case, the processor may calculate in advance, instead of the rotation resistance temperature curve with respect to the bearing temperature in the bearing initial state shown in FIG. 8, a coasting time curve in the bearing initial state indicating a coasting time with respect to the bearing temperature and an acceleration curve in the bearing initial state indicating a deceleration acceleration characteristic with respect to the bearing temperature, register data of the coasting time curve and the acceleration curve or an approximation function of the data in the memory of the control device 1, calculate a correction amount on the basis of the curve data or the approximation function, and perform temperature correction on a coasting time and acceleration.

A seventh aspect is explained in which a fine vibration component of spindle rotation caused by an indentation or the like of the bearing is detected to detect a spindle deteriorated state.

Figure 9:
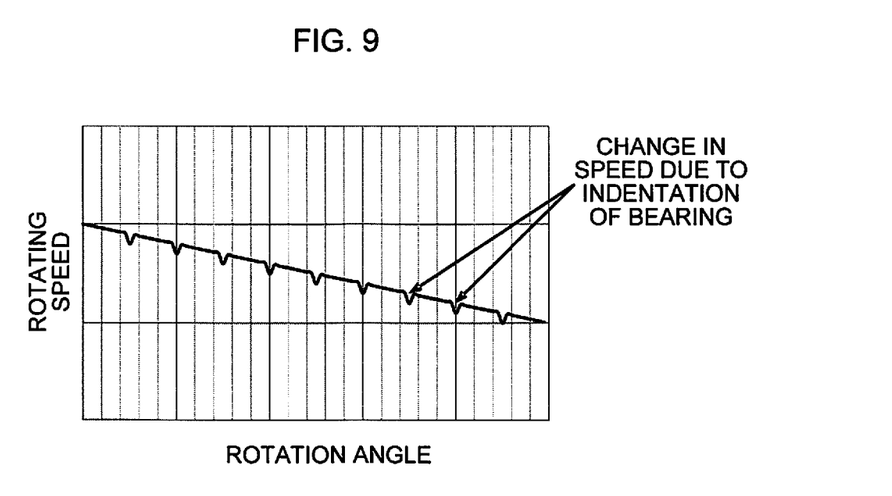
FIG. 9 is a diagram showing a change in rotating speed with respect to a rotation angle indicating an indentation of a bearing in an inertial rotation state of the spindle.

FIG. 9 is a diagram showing a change in spindle rotating speed caused by the indentation of the bearing when the spindle is rotated to coast. The speed cyclically changes with respect to a spindle rotation angle. It is possible to surmise according to the cyclical speed change that the indentation is present in the bearing of the spindle.

Figure 10:
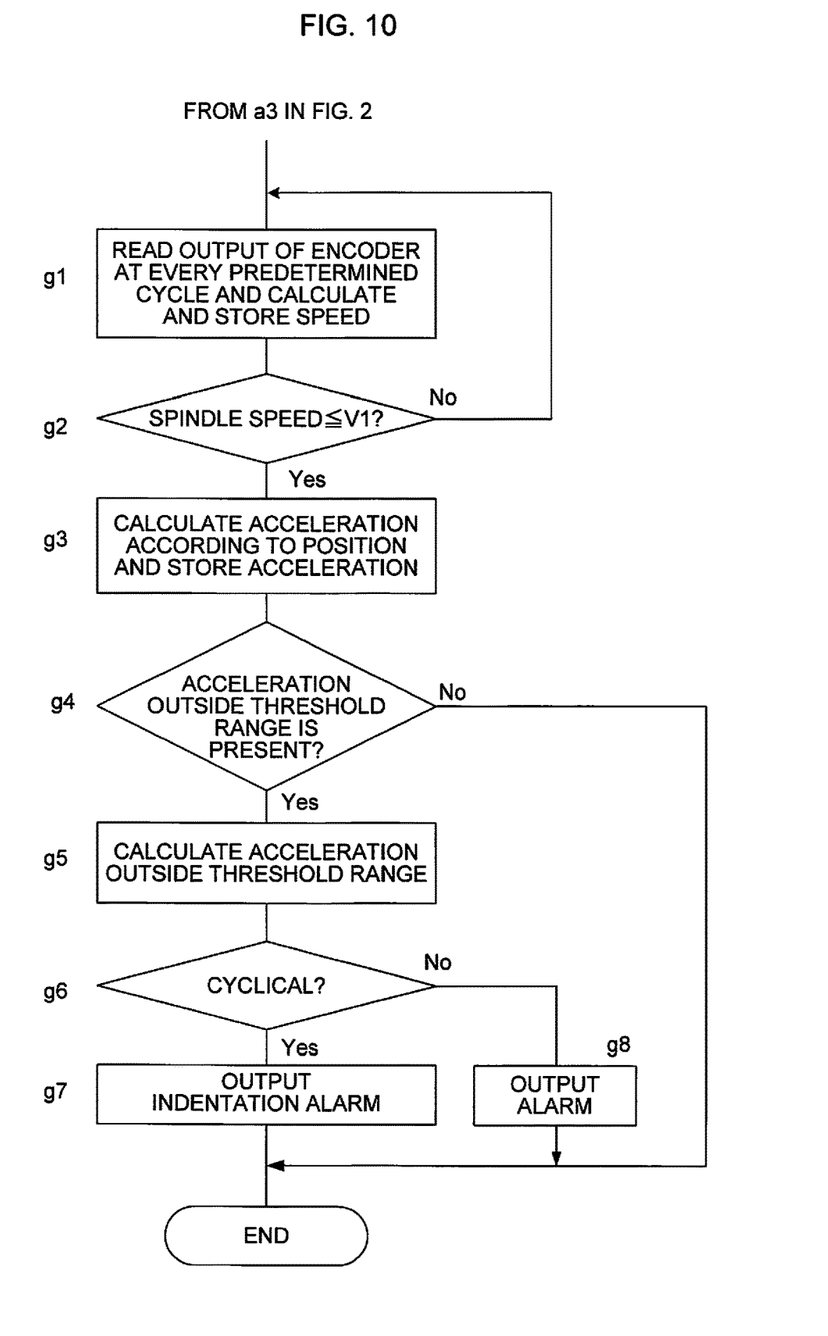
FIG. 10 is a flowchart for explaining a main part algorithm in a seventh aspect of the spindle-deterioration inspection processing (indentation detection processing) in the embodiment.

FIG. 10 is a part of a flowchart for explaining an algorithm of software in the seventh aspect of the spindle-deteriorated-state inspection processing for detecting fine vibration of spindle rotation caused by an indentation or the like of the bearing. In the seventh aspect, after processing same as the processing in steps a1 to a3 shown in FIG. 2 is performed, the processing shown in FIG. 10 is executed.

After driving the spindle 4 or the spindle motor 3 at the predetermined speed V0, the processor interrupts the power of the spindle motor 3 (steps a1 to a3), rotates the spindle 4 to coast, reads a spindle rotating position output from the encoder 5 at every predetermined cycle until the rotating speed of the spindle 4 or the spindle motor 3 reaches the set speed V1, calculates rotating speed, and stores the rotating position and the rotating speed (steps g1 and g2). When the rotating speed of the spindle 4 or the spindle motor 3 reaches the set speed V1, the processor calculates acceleration from rotating speeds detected at respective cycles stored in the memory, calculates accelerations according to rotating positions, and stores the accelerations (step g3). Subsequently, the processor determines whether acceleration outside the set threshold range between the lower limit threshold and the upper limit threshold is present among the calculated accelerations (step g4). If such acceleration is absent, the processor ends the processing.

On the other hand, if acceleration outside the threshold range between the lower limit threshold and the upper limit threshold is present, the processor calculates a rotation angle position of the acceleration (step g5). The processor determines from the calculated rotation angle position whether acceleration occurrence positions outside the threshold range between the lower limit threshold and the upper limit threshold are cyclical (step g6). That is, the processor determines whether position differences among the acceleration occurrence positions outside the threshold range between the lower limit threshold and the upper limit threshold are substantially equal within a predetermined range. When determining that the acceleration occurrence positions cyclically occur with respect to the spindle rotation angle within the predetermined range, the processor outputs an alarm of vibration generation with an indentation or the like of the bearing (step g7). When the acceleration occurrence positions are not cyclical, the processor outputs a normal alarm (step g8) and ends the processing.

Note that, in the seventh aspect, the processor determines the vibration generation by the indentation or the like of the bearing. However, the processor may execute steps a1 to a3 and steps g1 to g3 instead of performing the processing in steps g4 to g8 and display accelerations corresponding to obtained rotating positions of the spindle 4 on a display screen of a display of the control device 1. An operator may detect, with the display screen, a spindle deteriorated state such as vibration generation by the indentation of the bearing. When speed with respect to a spindle rotation angel is displayed on the display screen rather than the acceleration as shown in FIG. 9, the operator can also detect, for example, generation of vibration due to the indentation of the bearing.

In the aspects of the spindle-deteriorated-state inspection processing, the spindle deteriorated state is determined according to the differences in the coasting time, the acceleration, and the rotation resistance torque during the inertial rotation of the spindle 4. However, the deceleration acceleration of the inertial rotation of the spindle 4 is different depending on a tool attached to the spindle 4. Therefore, when the spindle-deteriorated-state inspection processing is executed, it is necessary to execute the spindle-deteriorated-state inspection processing in a state in which the tool is detached from the spindle 4 or in a state in which a specific tool is attached to the spindle 4.

If the tool is detached from the spindle 4 or the specific tool is attached to the spindle 4 to execute the spindle-deteriorated-state inspection processing, only a person in charge of maintenance familiar with the machine tool can perform the inspection. Therefore, it takes time to perform sufficient inspection.

Therefore, in a machine tool attached with a tool replacing device, if the tool is detached halfway in the tool replacement and the spindle-deteriorated-state inspection processing is executed before a new tool is attached, it is possible to inspect the spindle deteriorated state even when the maintenance is not performed. Note that, usually, during the tool replacement, since the spindle is pushed by a clamp mechanism of the tool, the spindle cannot be rotated. Therefore, it is necessary to move the clamp mechanism to bring the spindle into a rotatable state and then execute the spindle-deteriorated-state inspection processing.

The operator may cause the control device 1 to execute the spindle-deteriorated-state inspection processing in the aspects by commanding the control device 1 to execute the spindle-deteriorated-state inspection processing, cause the control device 1 to execute the spindle-deteriorated-state inspection processing during the tool replacement as explained above, or perform the spindle-deteriorated-state inspection processing every time at every machining cycle by programming a spindle-deteriorated-state inspection processing command in a machining program of machining executed by the machine tool.

Further, the processor may execute the spindle-deteriorated-state inspection processing command programmed in the machining program, for storing an execution enabling condition for the inspection function for the deteriorated state of the spindle in storing unit in advance only when a condition set separately is met. As the condition set separately, for example, it is assumed that a predetermined time (e.g., twenty-four hours) or more has elapsed from the last spindle deteriorated state inspection or the machine tool is not operated for eight hours in the past and a difference between the temperature of the spindle motor 3 and the room temperature is equal to or higher than 3 degrees Celsius.

Further, the processor may store, in the control device 1, date and time when the spindle-deteriorated-state inspection processing was performed and, when the spindle-deteriorated-state inspection processing is commanded, compare an elapsed time from date and time when the spindle-deteriorated-state inspection processing was executed last time and a threshold, and permit the spindle-deteriorated-state inspection processing only when time equal to or larger than the threshold has elapsed.

Rather than the machine tool automatically performing the spindle deteriorated state inspection, the operator can manually perform the spindle deteriorated state inspection. In this method, the operator manually operates the control device 1 to rotate the spindle 4 at the predetermined speed V0, then interrupts the power of the spindle motor 3 and starts measurement of time, and calculates time at a time when rotating speed reaches the predetermined value V1 (including zero) while the spindle 4 is rotated by inertia. The operator inspects the spindle deteriorated state according to the time (an inertial rotation time or a coasting time) or acceleration or rotation resistance torque calculated on the basis of the inertial rotation time or coasting time, coasting start speed of the spindle 4, and spindle speed at measurement end time.

A rotating position sensor and a temperature monitoring function are mounted on a spindle motor of a general numerically-controlled machine tool. Therefore, it is unnecessary to additionally mount a sensor when the present invention is carried out. However, in order to further improve reliability of a measurement result, a temperature sensor or the like may be added. The measurement result is saved in the memory of the control device 1 and the progress of a change in the measurement result is displayed on the display screen. Consequently, the person in charge of maintenance can also analyze the progress of deterioration more in detail.

The embodiment of the present invention is explained above. However, the present invention is not limited to the example of the embodiment explained above and can be carried out in other aspects by adding appropriate changes to the embodiment.

What is claimed is:

1. A machine tool having an inspection function for a deteriorated state of a spindle, the machine tool comprising:
    a spindle configured to hold a tool for machining work, the spindle being rotatably supported by a bearing,
    a motor configured to drive the spindle,
    an encoder configured to measure a rotation angle position of the spindle or the motor, and
    a processor configured to
        calculate rotating speed of the spindle or the motor from an output of the encoder,
        rotate the spindle or the motor at predetermined speed and thereafter interrupt power of the motor to rotate the spindle with inertia,
        measure, after the power of the motor is interrupted, an inertial rotation time until the calculated rotating speed reaches set target speed,
        set the measured inertial rotation time or a value calculated based on the measured inertial rotation time as a value for comparison with a threshold set in advance, and determine whether the value for comparison is equal to or smaller than the threshold; and
        output an alarm when the value for comparison is larger than the threshold.

2. The machine tool according to claim 1, wherein the processor is configured to
    calculate, as the value for comparison, acceleration by dividing, by the measured inertial rotation time, a difference between the predetermined speed and the set target speed, and
    determine whether the calculated acceleration is equal to or smaller than the threshold set in advance.

3. The machine tool according to claim 1, wherein the processor is configured to
    calculate acceleration by dividing, by the measured inertial rotation time, a difference between the predetermined speed and the set target speed,
    calculate, as the value for comparison, rotation resistance torque from the calculated acceleration and an inertial moment of a rotating body including the spindle, and
    determine whether the calculated rotation resistance torque is equal to or smaller than the threshold set in advance.

4. The machine tool according to claim 1, wherein
    a plurality of values to be compared with a threshold for a plurality of temperatures near the spindle is calculated and stored in advance as reference data or a function calculated from the reference data is stored, and
    the processor is configured to
        calculate a correction amount on the basis of the reference data or the function, and
        correct the value for comparison or correct the threshold based on the correction amount.

5. The machine tool according to claim 1, further comprising a memory configured to store an execution enabling condition for inspecting the deteriorated state of the spindle in advance,
    wherein, when an inspection command for the deteriorated state of the spindle is given, the processor is configured to determine
        whether the stored execution enabling condition is satisfied, and possibility of execution of the inspection of the deteriorated state of the spindle.

6. The machine tool according to claim 5, wherein the memory is configured to store an operation history of the spindle,
    the execution enabling condition is whether the stored operation history satisfies an operation history determined in advance.

7. The machine tool according to claim 5, wherein
    the memory is configured to store inspection date and time when an inspection for the deteriorated state of the spindle is executed,
    the execution enabling condition is whether an elapsed time from the last stored inspection date and time exceeds a threshold set in advance.

8. The machine tool according to claim 5, further comprising a temperature sensor configured to measure at least one of temperature of the spindle motor, bearing temperature of the spindle, or temperature near the bearing of the spindle, wherein
the execution enabling condition is whether the temperature detected by the temperature sensor is within a set threshold range.

9. The machine tool according to claim 1, wherein
the machine tool is a machine tool including a tool replacing device, and
the machine tool is configured to execute the inspection function for the deteriorated state of the spindle during tool replacement in a period after the tool is detached from the spindle and before a next tool is attached.

10. A machine tool having an inspection function for a deteriorated state of a spindle, the machine tool comprising:
a spindle configured to hold a tool for machining work, the spindle being rotatably supported by a bearing,
a motor configured to drive the spindle,
an encoder configured to measure a rotation angle position of the spindle or the motor, and
a processor configured to calculate rotating speed of the spindle or the motor from an output of the encoder, wherein
during tool replacement where the tool is detached from the spindle and before a new tool is attached to the spindle, the processor is configured to
rotate the spindle or the motor at predetermined speed and thereafter interrupt power of the motor to rotate the spindle with inertia,
clock a set predetermined time after the power of the motor is interrupted,
detect the calculated rotating speed when the set predetermined time is clocked,
calculate a value for comparison with a threshold set in advance, on the basis of the predetermined speed, the rotating speed detected when the set predetermined time is clocked, and the set predetermined time,
determine whether the calculated value for comparison is equal to or smaller than the threshold, and
output an alarm when the calculated value for comparison is larger than the threshold.

11. The machine tool according to claim 10, wherein the value for comparison is acceleration or rotation resistance torque during spindle deceleration.

12. A machine tool having an inspection function for a deteriorated state of a spindle, the machine tool comprising:
a spindle configured to hold a tool for machining work, the spindle being rotatably supported by a bearing,
a motor configured to drive the spindle,
an encoder configured to measure a rotation angle position of the spindle or the motor, and
a processor configured to
calculate rotating speed of the spindle or the motor from an output of the encoder,
rotate the spindle or the motor at predetermined speed and thereafter interrupt power of the motor to rotate the spindle with inertia,
calculate a value for comparison with a threshold set in advance, from the output of the encoder during inertial rotation of the spindle,
determine whether the calculated value for comparison is equal to or smaller than the threshold, and
output an alarm when the calculated value for comparison is larger than the threshold.

13. A machine tool having an inspection function for a deteriorated state of a spindle, the machine tool comprising:
a spindle configured to hold a tool for machining work, the spindle being rotatably supported by a bearing,
a motor configured to drive the spindle,
an encoder configured to measure a rotation angle position of the spindle or the motor,
a processor configured to
calculate rotating speed of the spindle or the motor from an output of the encoder;
rotate the spindle or the motor at predetermined speed and thereafter interrupt power of the motor to rotate the spindle with inertia; and
calculate deceleration on the basis of the output of the encoder read at every predetermined cycle during inertial rotation of the spindle, and
a memory configured to store at the every predetermined cycle, the rotation angle position read from the encoder and the calculated acceleration
wherein the processor is configured to further
determine whether the calculated acceleration equal to or larger than a predetermined threshold occurs in every same rotation angle amount, and
output an alarm when it is determined that the calculated acceleration equal to or larger than the predetermined threshold occurs in the every same rotation angle amount.

* * * * *